March 29, 1932.  F. LOSKE  1,851,712
BIPLANE PARACHUTE
Filed May 22, 1931
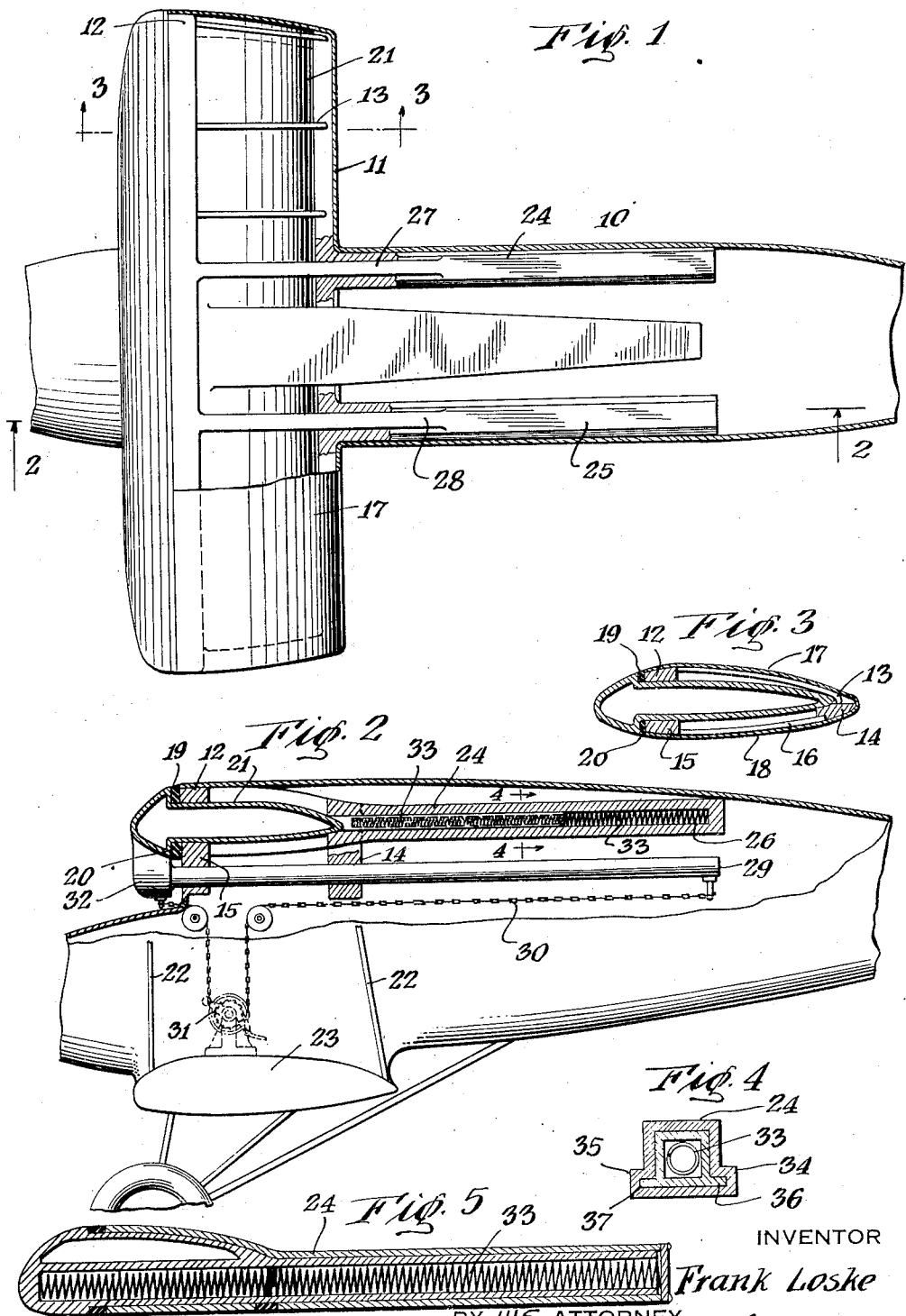
INVENTOR
Frank Loske
BY HIS ATTORNEY Patented Mar. 29, 1932

1,851,712

UNITED STATES PATENT OFFICE

FRANK LOSKE, OF BROOKLYN, NEW YORK

BIPLANE-PARACHUTE

Application filed May 22, 1931. Serial No. 539,327.

This invention relates to improvements in aircraft parachutes, as for instance described in my co-pending application Serial No. 535,135, filed May 5, 1931, of which this application is an improvement.

It is the principal object of this invention to improve the construction of the aircraft described in the above identified application by normally enclosing the gas container in the upper wing which for this purpose has the form of a cage in which the air container is normally held against displacement and in which it is firmly guided during the catapulting operation.

Another object of this invention is the provision of means as for instance rubber strips to prevent freezing of the parachute in high altitudes or in winter.

The catapulting of the gas container is effected in the same manner as disclosed in my co-pending application.

A further object of my invention is the provision of guide flanges for the catapulting rods or beams to securely guide the same during the catapulting operation.

These and other objects and advantages of my invention will become more fully known as the description thereof proceeds and will then be specifically defined in the appended claims.

In the accompanying drawings forming a material part of this disclosure:

Fig. 1 is a fragmentary top plan view of an airplane-parachute constructed according to my invention.

Fig. 2 is a longitudinal section through the same on line 2—2 of Figure 1.

Fig. 3 is a cross-section through the upper wing on line 3—3 of Figure 1.

Fig. 4 is a sectional end view illustrating the guiding of the gas container, the section being taken on line 4—4 of Figure 2.

Fig. 5 is a longitudinal section through a modified form.

As illustrated, the fuselage 10, of a biplane has formed its upper wing 11 therewith in the shape of a cage, composed of a frontal bar 12 connected by cross-pieces 13 bent at their rear ends to the lower rear part of the wing designated 14 and connected to the front part 15 by means of wires 16 or the like to form the cage which is covered on its upper and lower side by canvas covers 17, 18, or by similar suitable material.

Rubber strips 19, 20, produce a tight closure at the front between the walls of the gas container 21 and the cage to prevent freezing of the gas container in the cage when flying at high altitudes or in winter.

The cage is connected by struts 22 to the lower wing 23 of the bi-plane.

Hollow beams 24, 25, containing the catapulting springs 26 are connected by braces 27, 28, with the front bar 12 of the upper wing cage.

The catapulting is done in the manner disclosed in my co-pending application by the release of the locking means, particularly the locking sleeve as described in the co-pending application, on bar 29 standing under the control of chain 30, and operating drum and pedals 31, the front end of the chain connected to the gas container by means of block 32, the parts 14, 15, the guiding bar 29.

The gas container has rearwardly extending beams 33 formed therewith extending into casings 24, 25, and adapted to be propelled by the springs 26 and the casings 24, 25, have lateral flanges 34, 35, formed at their lower sides constituting guideways and in which flanges 36, 37, of the beams 33, are guided to present a firm support during the outward sliding thereof.

The operation and use of my improved airplane-parachute will be entirely clear from the above description and by reference to the drawings, the cage offering the greatest stability to the gas container, its rubber lining will prevent the parachute gas container from sticking in the cage by the accumulation of ice when a flight is undertaken in winter or at high altitudes, the general operation being identical with that described in my co-pending application, and the beams actuated by the propelling springs are rotatably and securely guided in their hollow casings.

It will be understood that I have described and shown the preferred form of my device only as one example of the many possible ways to construct my device in practice, and that I may make such changes therein as come within the scope of the appended claims without departure from the spirit of my invention and the principles involved.

Thus, for instance, I may extend the spring 33 into the gas container 21, as shown in Figure 5.

Having thus described my invention what I claim as new and desire to secure by Letters Patent is:

1. In a catapult aeroplane parachute, a wing having the form of a cage, a gas container normally held therein, rubber elements between cage and gas container for preventing freezing of the container in its cage, spring controlled rods connected to said gas container, and means for guiding these rods.

2. In a catapult aeroplane-parachute of the bi-plane type, an upper wing having the form of a cage, a gas container movably held therein, a pair of rubber strips between gas container and cage bars to prevent freezing of the parachute gas container within its cage, spring controlled rods secured to said parachute, hollow beams containing the springs controlling said rods extending into said beams, and flanges for guiding said rods within said beams.

3. In a parachute-airplane, of the bi-plane type, an upper wing in form of a cage and comprising an upper frontal bar and a lower frame, wire bars connecting the lower frame bars, and wire bars having curved rear ends connecting said upper frontal bar with the rear bar of said lower frame, covers for the upper and lower faces of the cage, a spring controlled gas container constituting a parachute normally held within said upper wing cage, a means for catapulting said gas container, and a support for said catapulting means during their catapulting operation.

4. In a parachute airplane having two superposed wings, the upper wing formed as a cage, a lower wing, struts connecting upper and lower wing, a gas container normally held in said cage-wing, and adapted to be catapulted forward therefrom to balance the plane in case of a nose-dive, hollow beams, means connecting said beams to said cage, rods in said hollow beams and normally compressed springs to expand and catapult the gas container from said cage when released, flanges on said beams and casings for said beams, flanges formed with said casings constituting guideways for the flanges on said beams to firmly support and guide the beams during the catapulting operation.

Signed at New York, in the county of New York, and State of New York, this 21st day of May, A. D. 1931.

FRANK LOSKE.